US012780981B2

(12) United States Patent
Mang et al.

(10) Patent No.: US 12,780,981 B2
(45) Date of Patent: Nov. 3, 2026

(54) BIOPOLYMER COMPOSITIONS INCORPORATING POLY(3-HYDROXYPROPIONATE)

(71) Applicant: Danimer IPCO, LLC, Bainbridge, GA (US)

(72) Inventors: Michael Mang, Bainbridge, GA (US); Phillip Van Trump, Decatur, GA (US)

(73) Assignee: Danimer IPCO, LLC, Bainbridge, GA (US)

( * ) Notice: Subject to any disclaimer, the term of this patent is extended or adjusted under 35 U.S.C. 154(b) by 845 days.

(21) Appl. No.: 17/876,663

(22) Filed: Jul. 29, 2022

(65) Prior Publication Data

US 2023/0046792 A1 Feb. 16, 2023

Related U.S. Application Data

(60) Provisional application No. 63/226,813, filed on Jul. 29, 2021.

(51) Int. Cl.

| | |
|---|---|
| ***C08L 67/04*** | (2006.01) |
| ***C08G 63/06*** | (2006.01) |
| ***C08G 63/08*** | (2006.01) |
| ***C08K 5/00*** | (2006.01) |

(52) U.S. Cl.

CPC ............ *C08G 63/06* (2013.01); *C08G 63/08* (2013.01); *C08K 5/0016* (2013.01); *C08K 5/005* (2013.01); *C08K 5/0066* (2013.01); *C08K 5/0083* (2013.01); *C08L 67/04* (2013.01); *C08K 2201/012* (2013.01); *C08L 2205/025* (2013.01)

(58) Field of Classification Search

None

See application file for complete search history.

(56) References Cited

U.S. PATENT DOCUMENTS

| | | | | |
|---|---|---|---|---|
| 5,389,447 | A | 2/1995 | Blume et al. | |
| 2011/0135863 | A1* | 6/2011 | Li | C08J 3/246 524/539 |
| 2012/0259028 | A1* | 10/2012 | Plimmer | C08L 67/04 521/134 |
| 2014/0088233 | A1* | 3/2014 | Kann | C08K 5/12 524/502 |
| 2017/0198136 | A1 | 7/2017 | Minami et al. | |
| 2024/0034876 | A1* | 2/2024 | Leon | C08L 67/04 |

FOREIGN PATENT DOCUMENTS

| | | | |
|---|---|---|---|
| CN | 105690938 | A | 6/2016 |
| KR | 2018072481 | * | 6/2018 |
| KR | 20190078387 | A | 7/2019 |
| KR | 102248403 | B1 | 5/2021 |
| WO | 2022143914 | A1 | 7/2022 |

OTHER PUBLICATIONS

Arai; Studies on Comonomer Compositional Distribution and its Effect on Some Physical Properties of Bacterial Poly(3-hydroxybutyric acid-co-hydroxypropionic acid); Polymer International 48 (1999) pp. 1219-1228. (Year: 1999).*

Cao; Phase Structure and Biodegradation of the Bacterial Poly(3-hydroxybutyric acid)/Chemosynthetic Poly(3-hydroxypropionic acid) Blend; Polymer Journal vol. 30 No. 9 (1998) pp. 743-752. (Year: 1998).*

Roger Thomas and Benedikt Schlicke Authorized Officers European Patent Office, International Search Report and Written Opinion, date of mailing Nov. 14, 2022, 14 pages.

* cited by examiner

*Primary Examiner* — David J Buttner

(74) *Attorney, Agent, or Firm* — Young Basile Hanlon & MacFarlane, P.C.

(57) ABSTRACT

A polymer composition is disclosed which composition includes at least a first polymer and a second polymer. The first polymer is made up of at least 10 mole percent repeat units of (3-hydroxypropionate). The second polymer is made up of a poly(hydroxyalkanoate) which does not include repeat units of (3-hydroxypropionate). A method for making the first polymer is also disclosed.

17 Claims, No Drawings

BIOPOLYMER COMPOSITIONS INCORPORATING POLY(3-HYDROXYPROPIONATE)

CROSS-REFERENCE TO RELATED APPLICATIONS

This application claims the benefit of the earlier filing date of provisional application 63/226,813, filed Jul. 29, 2021, the disclosure of which is incorporated by reference in its entirety.

FIELD

This disclosure relates to biodegradable polymeric compositions. More particularly, this disclosure relates to biodegradable polymeric compositions which incorporate poly (3-hydroxypropionate).

BACKGROUND

Biodegradable polymers are an area of increasing commercial interest. Advantageously, biodegradable polymers may be derived from renewable biomass resources, rather than from fossil fuels. Moreover, biodegradable polymers products are biodegradable in many environments, in contrast to conventional nondegradable polymers which can take centuries to degrade after typical landfill or other disposal.

An important class of biodegradable polymer are poly (hydroxyalkanoates) or PHAs. PHAs are naturally-occurring biodegradable aliphatic polyesters are industrially produced by large-scale bacterial fermentation. There are a wide variety of different polymer structures within the class of PHA polymers, including both homopolymer and copolymer forms.

While being desirably biodegradable, the preparation of PHAs by bacterial fermentation is relatively slow and can be expensive. It would therefore be desirable to provide novel PHA compositions which incorporate PHAs which may be prepared by chemical, rather than biological, processes.

SUMMARY OF THE INVENTION

In a first aspect, the present disclosure provides a polymer composition. According to one embodiment, the polymer composition includes at least a first polymer and a second polymer. The first polymer is made up of at least 10 mole percent repeat units of (3-hydroxypropionate). The second polymer is made up of a poly(hydroxyalkanoate) which does not include repeat units of (3-hydroxypropionate).

In other embodiments, the first polymer is a copolymer or a terpolymer. This copolymer or terpolymer includes at least a first repeat unit which is (3-hydroxypropionate) and a second repeat unit according to Formula I Formula I

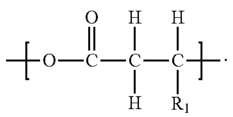

Optionally, the copolymer or terpolymer may also include a third repeat unit according to Formula II, Formula II

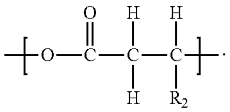

For Formulas I and II above, R1 and R2 are each independently selected from the group consisting of linear or branched alkyl groups having from 1 to 22 carbon atoms.

In certain embodiments, the polymer composition is preferably made up of about 1 to about 99 weight percent of the first polymer and from about 99 to about 1 weight percent of the second polymer. More preferably, the polymer composition is made up of from about 25 to about 75 weight percent of the first polymer and from about 75 to about 25 weight percent of the second polymer. Even more preferably, the polymer composition is made up of from about 40 to about 60 weight percent of the first polymer and from about 60 to about 40 weight percent of the second polymer.

In some instances, the polymer composition may also include at least one additional biopolymer, which is selected from the group consisting of polycaprolactone, poly(butylene succinate), poly(butylene succinate-co-butylene adipate), poly(lactic acid), poly(butylene adipate-co-terephtalate) and mixtures thereof. In some embodiments, the polymer composition may include from about 5 to about 75 weight percent of the least one additional biopolymer.

As for the second polymer, in certain embodiments, the second polymer is preferably made up of 2-hydroxyalkanoate repeat units, 3-hydroxyalkanaoate repeat units, or 4-hydroxyalkanoate repeat units, each with or without branching from 1 carbon branches to 12 carbon branches.

In some embodiments, the second polymer is preferably made up of poly(3-hydroxybutyrate-co-3-hydroxyhexanoate) ("P(3HB-co-3HHx)"). More particularly, in some embodiments, this P(3HB-co-3HHx) is itself preferably made up of from about 75 to about 99 mole percent hydroxybutyrate repeat units and from about 1 to about 25 mole percent hydroxyhexanoate repeat units. Even more preferably, the P(3HB-co-3HHx) is made up of from about 93 to about 98 mole percent hydroxybutyrate repeat units and from about 2 to about 7 mole percent hydroxyhexanoate repeat units.

The polymer composition may also include various additives in addition to the aforementioned polymers.

According to certain embodiments, the polymer composition also preferably includes a nucleating agent selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, poly(hydroxybutyrate), thymine, cyanuric acid, cytosine, adenine, uracil, guanine, boron nitride and mixtures thereof.

In accordance with some embodiments, the polymer composition also preferably includes a plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly(hydroxyalkanoates)

copolymers comprising at least 18 mole percent monomer residues of hydroxyalkanoates other than hydroxybutyrate, and mixtures thereof.

In some instances, the polymer composition also preferably includes a filler selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof.

In certain embodiments, the polymer composition also preferably includes an impact modifier selected from the group consisting of group consisting of acrylic-based resins and emulsions, isosorbide derivatives, natural rubbers, aliphatic polyesters, or mixtures thereof.

In some instances, the polymer composition preferably also includes at least one additive selected from the group consisting of lubricants, antioxidants, stabilizers, moisture scavengers, coupling agents, nucleators, or flame retardants.

Optionally, the first polymer and the second polymer may be further reacted with one another. Thus, in some instances, the polymer composition preferably includes a catalyst or an initiator which induces reaction of the poly(3-hydroxypropionate) and the at least one additional poly(hydroxyalkanoate). The polymer composition thus also includes a reaction product formed from reaction the poly(3-hydroxypropionate) and the at least one additional poly(hydroxyalkanoate).

In a further aspect, the present disclosure also provides a converted article which is made up of the aforementioned polymer composition. For instance, in certain embodiments of the present disclosure, the converted article may be selected from the group consisting of films, fibers, sheets, molded articles, rotomolded articles, extrusion blow molded articles, injection stretch blow molded articles, foams, melt coatings on substrates, and calendared sheets.

In still another aspect, the present disclosure also provides a method for making a poly(hydroxyalkanoate) copolymer or terpolymer. According to one embodiment, the methods includes a first step of combining:

beta-propiolactone, a first substituted beta-propiolactone according to Formula III Formula III

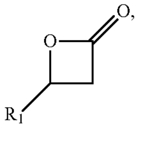

and (3) optionally, a second substituted beta-propiolactone according to Formula IV Formula IV

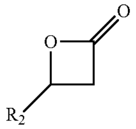

to form a reaction mixture. The method also includes a second step of polymerizing the reaction mixture to form a copolymer or terpolymer which comprises a first repeat unit which is (3-hydroxypropionate), a second repeat unit according to Formula I Formula I

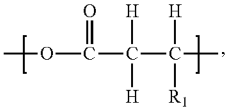

, and optionally, a third repeat unit according to Formula II,

Formula II

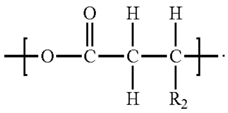

For each of Formulas I-IV, R1 and R2 are each independently selected from the group consisting of linear or branched alkyl groups having from 1 to 22 carbon atoms.

DETAILED DESCRIPTION

The present disclosure first provides a novel polymer composition which includes at least a first polymer and a second polymer. The first polymer is made up of at least 10 mole percent repeat units of (3-hydroxypropionate). The second polymer is made up of a poly(hydroxyalkanoate) which does not include repeat units of (3-hydroxypropionate).

Thus, the composition first includes a polymer which includes repeat units of (3-hydroxypropionate). In general, the first polymer includes at least 10 mole percent repeat units of (3-hydroxypropionate). In some embodiments, the first polymer may include from about 10 to about 99 mole percent of includes repeat units of (3-hydroxypropionate). Even more preferably, the first polymer may include from about 25 to about 100 mole percent of includes repeat units of (3-hydroxypropionate).

In some instances, may be a homopolymer, i.e., substantially all of the first polymer may be made up of the repeat units of (3-hydroxypropionate). In this case, the first polymer may be referred to simply as poly(3-hydroxypropionate).

In other embodiments, however, the first polymer may be a copolymer or even a terpolymer. In these embodiments, this copolymer or terpolymer includes at least a first repeat unit which is (3-hydroxypropionate) and a second repeat unit according to Formula I Formula I

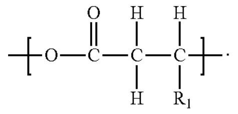

Optionally, the first polymer may also include a third repeat unit according to Formula II, Formula II

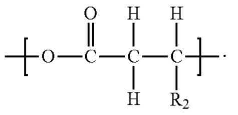

For Formulas I and II above, R1 and R2 are each independently selected from the group consisting of linear or branched alkyl groups having from 1 to 22 carbon atoms.

The polymer composition also includes a second polymer. This second polymer is a poly(hydroxyalkanoate) which does not include repeat units of (3-hydroxypropionate).

In some embodiments, according to the present disclosure, the second polymer may, for instance, be made up of 2-hydroxyalkanoate repeat units, 3-hydroxyalkanaoate repeat units, or 4-hydroxyalkanoate repeat units, each with or without branching from 1 carbon branches to 12 carbon branches.

In some instances, the second polymer is preferably made up of poly-3-hydroxybutyrate-co-3-hydroxyhexanoate ("P(3HB-co-3HHx)"). More particularly, in some embodiments, this P(3HB-co-3HHx) is itself preferably made up of from about 75 to about 99 mole percent hydroxybutyrate repeat units and from about 1 to about 25 mole percent hydroxyhexanoate repeat units. Even more preferably, the P(3HB-co-3HHx) is made up of from about 93 to about 98 mole percent hydroxybutyrate repeat units and from about 2 to about 7 mole percent hydroxyhexanoate repeat units.

The relative amounts of the first polymer and the second polymer in the polymer composition may vary considerably. In general, the polymer composition may be made up of about 1 to about 99 weight percent of the first polymer and from about 99 to about 1 weight percent of the second polymer.

More preferably, the polymer composition is made up of from about 25 to about 75 weight percent of the first polymer and from about 75 to about 25 weight percent of the second polymer. Even more preferably, the polymer composition is made up of from about 40 to about 60 weight percent of the first polymer and from about 60 to about 40 weight percent of the second polymer.

In addition to the first polymer and the second polymer, the polymer composition may in some instances also include at least one additional biopolymer. This additional biopolymer may be selected from the group consisting of polycaprolactone, poly(butylene succinate), poly(butylene succinate-co-butylene adipate), poly(lactic acid), and mixtures thereof. In some embodiments, the polymer composition may include from about 5 to about 75 weight percent of the least one additional biopolymer.

The polymer composition may also include various additives in addition to the aforementioned polymers.

For instance, the polymer composition may also include a nucleating agent selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, poly(hydroxybutyrate), thymine, cyanuric acid, cytosine, adenine, uracil, guanine, boron nitride and mixtures thereof.

The polymer composition may also include a plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly(hydroxyalkanoates) copolymers comprising at least 18 mole percent monomer residues of hydroxyalkanoates other than hydroxybutyrate, and mixtures thereof.

In some instances, the polymer composition also preferably includes a filler selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof.

In certain embodiments, the polymer composition also preferably includes an impact modifier selected from the group consisting of group consisting of acrylic-based resins and emulsions, isosorbide derivatives, natural rubbers, aliphatic polyesters, or mixtures thereof.

In some instances, the polymer composition preferably also includes at least one additive selected from the group consisting of lubricants, antioxidants, stabilizers, moisture scavengers, coupling agents, nucleators, or flame retardants.

The polymer composition according to the present disclosure is typically prepared by blending, such as melt blending, of the first polymer and the second polymer, along with any other polymers or additives which may optionally be included in the composition. This blending can be accomplished using conventional melt blending techniques such as single screw extrusion, twin screw extrusion, or three roll mills.

In another embodiment, the first polymer and the second polymer may be further reacted with one another. Thus, in some instances, the polymer composition preferably includes a catalyst or an initiator which induces reaction of the poly(3-hydroxypropionate) and the at least one additional poly(hydroxyalkanoate). The polymer composition thus also includes a reaction product formed from reaction the poly(3-hydroxypropionate) and the at least one additional poly(hydroxyalkanoate).

The present disclosure also provides a method for making the poly(hydroxyalkanoate) copolymer or terpolymer discussed above. According to one embodiment, the methods include a first step of combining:

beta-propiolactone, a first substituted beta-propiolactone according to Formula III Formula III

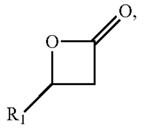

and optionally, a second substituted beta-propiolactone according to Formula IV

Formula IV

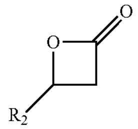

to form a reaction mixture.

For each of Formulas III and IV above, R1 and R2 are each independently selected from the group consisting of linear or branched alkyl groups having from 1 to 22 carbon atoms.

According to the present disclosure, this mixture is then polymerized in a second step to form a copolymer or terpolymer. Typically, the polymerization reaction may be carried out at a reaction temperature from about 20 to about 120 C. A catalyst or initiator, such as alkali metal or ammonium alkoxide, is also typically used to aid the polymerization.

The resultant copolymer or terpolymer is made up
a first repeat unit which is (3-hydroxypropionate),
a second repeat unit according to Formula I Formula I

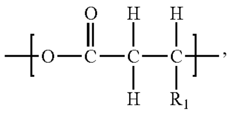 and optionally, a third repeat unit according to Formula II,

Formula II

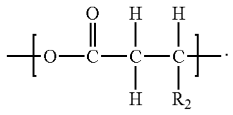

For each of Formulas I and II, R1 and R2 are each independently selected from the group consisting of linear or branched alkyl groups having from 1 to 22 carbon atoms.

Advantageously, the polymer composition prepared according to the present disclosure is industrially and/or home compostable, as determined by ASTM D6400.

In a further aspect, the present disclosure also provides a converted article which is made up of the aforementioned polymer composition. For instance, in certain embodiments of the present disclosure, the converted article may be selected from the group consisting of films, fibers, sheets, molded articles, rotomolded articles, extrusion blow molded articles, injection stretch blow molded articles, foams, melt coatings on substrates, and calendared sheets.

The present disclosure is also further illustrated by the following embodiments:

Embodiment 1. A polymer composition comprising a blend of a first polymer and a second polymer, wherein the first polymer comprises at least 10 mole percent repeat units of (3-hydroxypropionate) and the second polymer comprises a poly(hydroxyalkanoate) which does not include repeat units of (3-hydroxypropionate).

Embodiment 2. The polymer composition of Embodiment 1, wherein the first polymer comprises poly(3-hydroxypropionate).

Embodiment 3. The polymer composition of Embodiment 1 or 2, wherein the first polymer comprises a copolymer or terpolymer, wherein the copolymer or terpolymer comprises
a first repeat unit which is (3-hydroxypropionate),
a second repeat unit according to Formula I Formula I

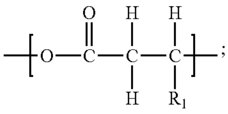 ; and optionally, a third repeat unit according to Formula II,

Formula II

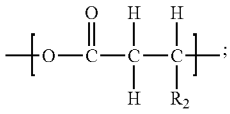 ; and wherein R1 and R2 are each independently selected from the group consisting of linear or branched alkyl groups having from 1 to 22 carbon atoms.

Embodiment 4. The polymer composition of any of the preceding Embodiments, wherein the polymer composition comprises from about 1 to about 99 weight percent of the first polymer and from about 99 to about 1 weight percent of the second polymer.

Embodiment 5. The polymer composition of any of the preceding Embodiments, wherein the polymer composition comprises from about 25 to about 75 weight percent of the first polymer and from about 75 to about 25 weight percent of the second polymer.

Embodiment 6. The polymer composition of any of the preceding Embodiments, wherein the polymer composition comprises from about 40 to about 60 weight percent of the first polymer and from about 60 to about 40 weight percent of the second polymer.

Embodiment 7. The polymer composition of any of the preceding Embodiments, wherein the polymer composition further comprises at least one additional biopolymer selected from the group consisting of polycaprolactone, poly(butylene succinate), poly(butylene succinate-co-butylene adipate), poly(lactic acid), poly(butylene adipate-co-terephthalate) and mixtures thereof.

Embodiment 8. The polymer composition of Embodiment 7, wherein the polymer composition comprises from about 5 to about 75 weight percent of the least one additional biopolymer.

Embodiment 9. The polymer composition of any of the preceding Embodiments, wherein the second polymer comprises 2-hydroxyalkanoate repeat units, 3-hydroxyalkanaoate repeat units, or 4-hydroxyalkanoate repeat units, each with or without branching from 1 carbon branches to 12 carbon branches.

Embodiment 10. The polymer composition of any of the preceding Embodiments, wherein the second polymer comprises poly-3-hydroxybutyrate-co-3-hydroxyhexanoate ("P(3HB-co-3HHx)").

Embodiment 11. The polymer composition of Embodiment 10, wherein the P(3HB-co-3HHx) comprises from about 75 to about 99 mole percent hydroxybutyrate repeat units and from about 1 to about 25 mole percent hydroxyhexanoate repeat units.

Embodiment 12. The polymer composition of Embodiment 10, wherein the P(3HB-co-3HHx) preferably comprises from about 93 to about 98 mole percent hydroxybutyrate repeat units and from about 2 to about 7 mole percent hydroxyhexanoate repeat units.

Embodiment 13. The polymer composition of any of the preceding Embodiments, further comprising a nucleating agent selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, poly(hydroxybutyrate), thymine, cyanuric acid, cytosine, adenine, uracil, guanine, boron nitride and mixtures thereof.

Embodiment 14. The polymer composition of any of the preceding Embodiments, further comprising a plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly(hydroxyalkanoates) copolymers comprising at least 18 mole percent monomer residues of hydroxyalkanoates other than hydroxybutyrate, and mixtures thereof.

Embodiment 15. The polymer composition of any of the preceding Embodiments, further comprising a filler selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof.

Embodiment 16. The polymer composition of any of the preceding Embodiments, further comprising an impact modifier selected from the group consisting of group consisting of acrylic-based resins and emulsions, isosorbide derivatives, natural rubbers, aliphatic polyesters, or mixtures thereof.

Embodiment 17. The polymer composition of any of the preceding Embodiments, further comprising at least one additive selected from the group consisting of lubricants, antioxidants, stabilizers, moisture scavengers, coupling agents, nucleators, or flame retardants.

Embodiment 18. The polymer composition of any of the preceding Embodiments, wherein the composition further comprises a catalyst or an initiator which induces reaction of the poly(3-hydroxypropionate) and the at least one additional poly(hydroxyalkanoate) and a reaction product formed from reaction the poly(3-hydroxypropionate) and the at least one additional poly(hydroxyalkanoate).

Embodiment 19. A converted article comprising the polymer composition of any of the preceding Embodiments, wherein the converted article is selected from the group consisting of films, fibers, sheets, molded articles, rotomolded articles, extrusion blow molded articles, injection stretch blow molded articles, foams, melt coatings on substrates, and calendared sheets.

Embodiment 20. A method for making a poly(hydroxyalkanoate) copolymer or terpolymer, comprising the steps of:

combining beta-propiolactone, a first substituted beta-propiolactone according to Formula III Formula III

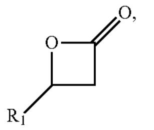 and optionally, a second substituted beta-propiolactone according to Formula IV Formula IV

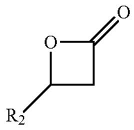

to form a reaction mixture; and polymerizing the reaction mixture to form a copolymer or terpolymer which comprises a first repeat unit which is (3-hydroxypropionate), a second repeat unit according to Formula I Formula I

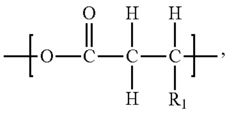, and optionally, a third repeat unit according to Formula II,

Formula II

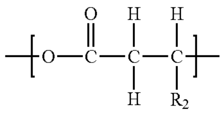

wherein R1 and R2 are each independently selected from the group consisting of linear or branched alkyl groups having from 1 to 22 carbon atoms.

The following non-limiting examples illustrate various additional aspects of the invention. Unless otherwise indicated, temperatures are in degrees Celsius and percentages are by weight based on the dry weight of the formulation.

Example 1

In this Example, samples of poly(hydroxyalkanoate) compositions were compounded using a 40 mm twin screw extruder at the Danimer Polymer Development Center, in Bainbridge Ga. Pentaerythritol was added to the samples at 1.0 weight percent to facilitate pelletization. In a first (control) sample, the composition included only a poly (hydroxyalkanoate) (99 weight percent) and pentaerythritol (1 weight percent). In a second sample, the composition was made up of about 89 weight percent of the same poly (hydroxyalkanoate), about 10 weight percent of Poly(3-hydroxypropionate) (P3HP), and about 1 weight percent of pentaerythritol.

The materials were processed at typical PHA process conditions for unknown R&D samples, with a target melt temperature of approximately 165° C. The melt flow rate was measured at 175° C. using a 10 kg weight. Both the number average molecular weight (Mn) and the weight average molecular weight (Mw) of each sample was also measured using gel permeation chromatography using chloroform as a solvent. The results were as follows:

| Product | Composition | MFR (g/10 min) | Mw | Mn |
|---|---|---|---|---|
| Control | PHA/ pentaerythritol 99/1 | 17.4 | 547,000 | 189,000 |
| Example 1 | PHA/P3HP/ pentaerythritol 89/10/1 | 265 | 622,000 | 245,000 |

These results show that the inclusion of a relatively small amount of P3HP in the composition led to a dramatic increase in melt flow rate (MFR). This is particularly surprising because both measures of molecular weight (Mn and Mw) were greater in the sample containing P3HP than in the control sample.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A polymer composition comprising a blend of a first polymer, a second polymer, and a third polymer, wherein the first polymer comprises a copolymer or terpolymer, wherein the copolymer or terpolymer comprises a first repeat unit which is (3-hydroxypropionate), a second repeat unit according to Formula I Formula I

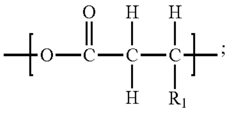

; and optionally, a third repeat unit according to Formula II,

Formula II

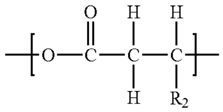

wherein $R_1$ and $R_2$ are each independently selected from the group consisting of linear or branched alkyl groups having from 1 to 22 carbon atoms, and the first polymer comprises at least 10 mole percent repeat units of (3-hydroxypropionate), the second polymer comprises 3-hydroxyalkanaoate repeat units or 4-hydroxyalkanoate repeat units, wherein the second polymer does not include repeat units of (3-hydroxypropionate), and the third polymer comprises poly(lactic acid).

2. The polymer composition of claim 1, wherein the polymer composition comprises from 1 to 99 weight percent of the first polymer and from 99 to 1 weight percent of the second polymer.

3. The polymer composition of claim 1, wherein the polymer composition comprises from 25 to 75 weight percent of the first polymer and from 75 to 25 weight percent of the second polymer.

4. The polymer composition of claim 1, wherein the polymer composition comprises from 40 to 60 weight percent of the first polymer and from 60 to 40 weight percent of the second polymer.

5. The polymer composition of claim 1, wherein the polymer composition further comprises polycaprolactone.

6. The polymer composition of claim 1, wherein the polymer composition comprises from 5 to 75 weight percent of the third polymer.

7. The polymer composition of claim 1, wherein the second polymer comprises branching from 1 carbon branch to 12 carbon branches.

8. The polymer composition of claim 1, wherein the second polymer comprises poly-3-hydroxybutyrate-co-3-hydroxyhexanoate.

9. The polymer composition of claim 8, wherein the poly-3-hydroxybutyrate-co-3-hydroxyhexanoate comprises from 75 to 99 mole percent hydroxybutyrate repeat units and from 1 to 25 mole percent hydroxyhexanoate repeat units.

10. The polymer composition of claim 8, wherein the poly-3-hydroxybutyrate-co-3-hydroxyhexanoate comprises from 93 to 98 mole percent hydroxybutyrate repeat units and from 2 to 7 mole percent hydroxyhexanoate repeat units.

11. The polymer composition of claim 1, further comprising a nucleating agent selected from the group consisting of erythritols, pentaerythritol, dipentaerythritols, artificial sweeteners, stearates, sorbitols, mannitols, inositols, polyester waxes, nanoclays, behenamide, erucamide, stearamide, oleamide, poly(hydroxybutyrate), thymine, cyanuric acid, cytosine, adenine, uracil, guanine, boron nitride and mixtures thereof.

12. The polymer composition of claim 1, further comprising a plasticizer selected from the group consisting of sebacates, citrates, fatty esters of adipic, succinic, and glucaric acids, lactates, alkyl diesters, citrates, alkyl methyl esters, dibenzoates, propylene carbonate, caprolactone diols having a number average molecular weight from 200-10,000 g/mol, poly(ethylene glycols) having a number average molecular weight of 400-10,000 g/mol, esters of vegetable oils, long chain alkyl acids, adipates, glycerol, isosorbide derivatives or mixtures thereof, polymeric plasticizers, poly (hydroxyalkanoates) copolymers comprising at least 18 mole percent monomer residues of hydroxyalkanoates other than hydroxybutyrate, and mixtures thereof.

13. The polymer composition of claim 1, further comprising a filler selected from the group consisting of calcium carbonate, talc, nano clays, nanocellulose, hemp fibers, kaolin, carbon black, wollastonite, glass fibers, carbon fibers, graphite fibers, mica, silica, dolomite, barium sulfate, magnetite, halloysite, zinc oxide, titanium dioxide, montmorillonite, feldspar, asbestos, boron, steel, carbon nanotubes, cellulose fibers, flax, cotton, starch, polysaccharides, aluminum hydroxide, magnesium hydroxide, modified starches, chitins and chitosans, alginates, gluten, zein, casein, collagen, gelatin, polysaccharides, guar gum, xanthan gum, succinoglycan, natural rubbers; rosinic acid, lignins, natural fibers, jute, kenaf, hemp, ground nut shells, wood flour, and mixtures thereof.

14. The polymer composition of claim 1, further comprising an impact modifier selected from the group consisting of group consisting of acrylic-based resins and emulsions, isosorbide derivatives, natural rubbers, aliphatic polyesters, or mixtures thereof.

15. The polymer composition of claim 1, further comprising at least one additive selected from the group consisting of lubricants, antioxidants, stabilizers, moisture scavengers, coupling agents, nucleators, or flame retardants.

16. The polymer composition of claim 1, wherein the composition further comprises a catalyst or an initiator which induces reaction of the first polymer and the second polymer and a reaction product formed from reaction of the first polymer and the second polymer.

17. A converted article comprising the polymer composition of claim 1, wherein the converted article is selected from the group consisting of films, fibers, sheets, molded articles, rotomolded articles, extrusion blow molded articles, injection stretch blow molded articles, foams, melt coatings on substrates, and calendared sheets.

* * * * *